United States Patent Office

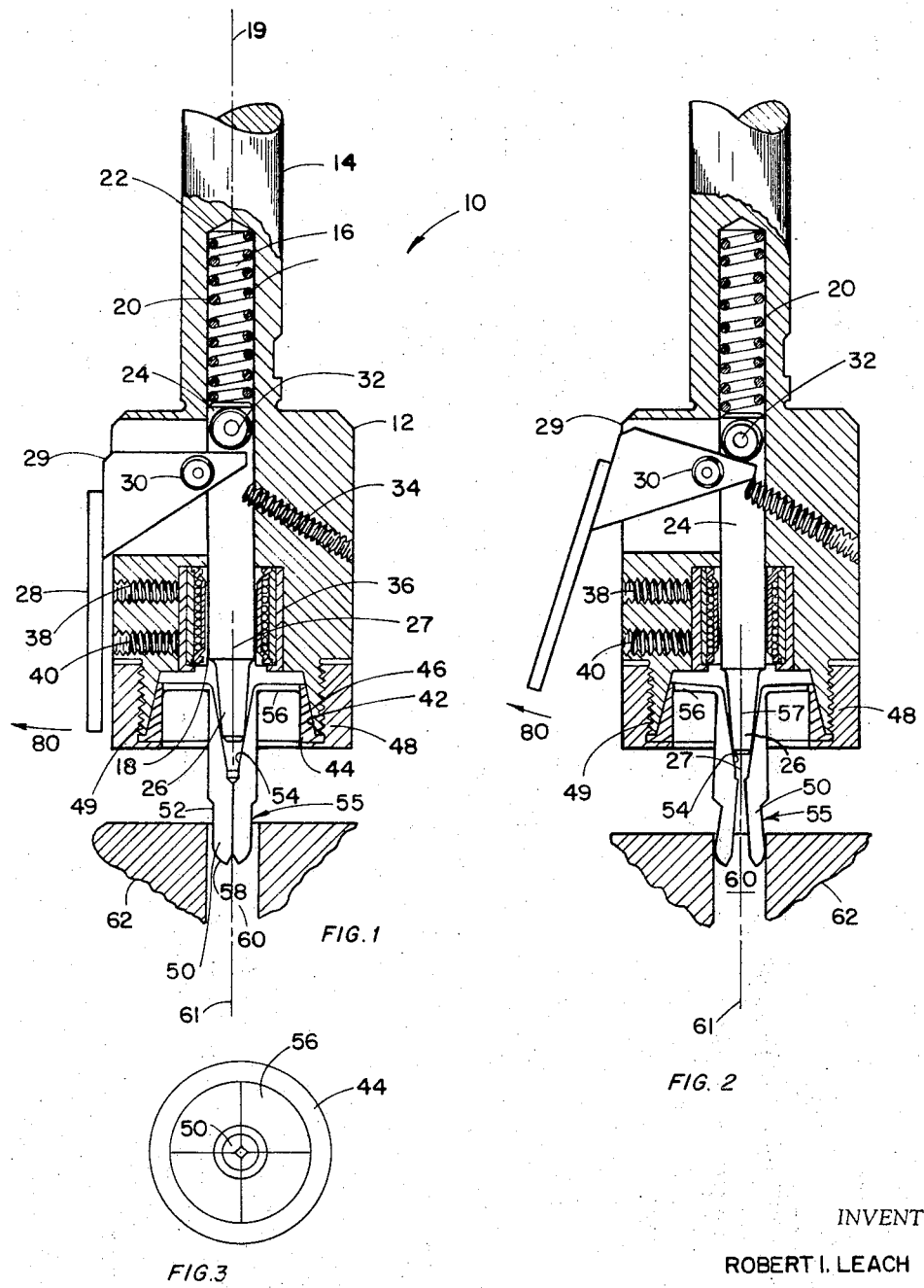

3,352,021
Patented Nov. 14, 1967

3,352,021
INTERNAL LOCATING DEVICE FOR A
COORDINATE MEASURING MACHINE
Robert I. Leach, Clinton, and John H. Lanahan, Whitesboro, N.Y., assignors to The Bendix Corporation, a corporation of Delaware
Filed Oct. 22, 1965, Ser. No. 501,577
7 Claims. (Cl. 33—174)

ABSTRACT OF THE DISCLOSURE

A locating probe for accurately locating the hole centerline in a workpiece. The probe includes a stylus having a plurality of expandable fingers which are insertable in a contracted state within the hole to be measured. The probe fingers are spring mounted and when released, swing outward in an arc to contact the inside diameter of a hole at a depth sufficiently below its edge to avoid burrs, counter-sink areas, etc. which might induce errors. The outward expansion of the fingers is produced by a spring-biased plunger member centrally located with respect to the fingers. Other features include a probe holder which provides accurate location, ease of operation, and quick stylus replacement.

---

The present invention may be used, for example, with a coordinate measuring machine of the type described in copending, commonly-assigned application Ser. No. 468,736, filed on July 1, 1965, in the names of the present inventors and entitled, "Coordinate Measuring Machine."

It is an object of the present invention to provide a novel probe structure and function for accurately locating a hole in a workpiece which is precise, durable and inexpensive to manufacture and assemble.

It is an object of the present invention to provide a novel probe structure and function which locates a hole in a workpiece below the surface of the hole.

Another object of the present invention is to provide a novel probe structure which is self-centering when located within the hole.

Another object of the present invention is to provide a novel structure for exchanging probe tips which automatically insures accurate alignment of the probe tips.

Another object of the present invention is to provide a novel probe device for accurately locating the axis of a hole relative to an operational head which is insensitive to dirt, dust, temperature variations and other common environmental problems.

Another object of the present invention is to provide a novel probe device for locating a hole relative to an operational head which senses the inner circumference of the hole.

Another object of the present invention is to provide a novel probe device for locating a hole relative to an operational head which can be easily and quickly operated by hand.

A further object of the present invention is to provide a novel probe apparatus for locating accurately a hole in a workpiece relative to an operational head which, once placed within the hole by the operator, frees the operator to make the reading desired.

When a hole is drilled or bored or otherwise cut into a workpiece, imperfections such as burrs frequently occur at the surface of the hole. If the hole is threaded or tapped, the first thread is frequently non-concentric with the hole. Further, many holes are countersunk or chamfered. The countersinking or chamfering is frequently non-concentric with the hole since its location is generally non-critical. Nevertheless, prior art devices sought to locate the hole axis with a conical probe which sensed the hole periphery at the surface of the workpiece. Such measurements are inherently inaccurate because of the metal burrs which frequently occur and because of the non-concentricity of the first thread and because of the non-concentric chamfering. The present invention eliminates these inherent inaccuracies by locating the hole axis from circumferential contact within the hole.

A still further object of the present invention is to provide a semiautomatic expandable probe tip structure with low operating friction and high positional stability.

Additional objects and advantages of the present invention will be apparent from the following illustration and description of operation of an embodiment of the novel probe device.

FIGURE 1 is a side elevational view of an embodiment of the present invention, partly broken away and partly in section, shown with an unexpanded stylus tip inside of a hole in a workpiece;

FIGURE 2 is a view identical with FIGURE 1 except that the sylus and control lever are shown in an operational position locating the axis of a hole in a workpiece relative to an operational head; and FIGURE 3 is an end view of the stylus structure.

Turning now to FIGURE 1, there is indicated generally by the numeral 10 a probe device for a coordinate measuring machine or an operational head having a housing 12 and a post 14 for connection to the operating head (not shown). The housing 12 and post 14 have an axially-extending passage 16 opened at one end 18 which has an axis 19. A coil spring 20 is fitted into the passage 16. A generally-cylindrical rod or plunger 24 having a frusto-conical or tapered end portion 26 is journalled into the passage with the tapered end portion projecting outside of the passage. The coil spring 20 is compressively confined between the closed end 22 of the passage and the plunger 24.

A control lever or handle 28 having an arm 29 is rotatably connected to the housing 12 by bearings 30. The plunger 24 has bearings 32 connected thereto which ride on the rotating arm 29. The spring 20 urges the rod bearing 32 against the arm 29 with sufficient force to rotate the control handle 28 to its fully open position. As the control lever rotates in the direction shown by arrow 80, the plunger moves axially in the passage 16 in the direction of the open end of the passage 18 downwardly. A stop or abutment screw 34 is threaded in the housing member to engage the arm 29 to limit its travel and thereby limit the travel of the rod 26. Normally, the stylus 55 contacts the inner wall of the hole before arm 29 contacts abutment screw 34. Abutment screw 34 prevents overtravel of the system when the stylus is not in the proper sized hole. An adjustable circulating ball bearing bushing device 36 is disposed in the housing below the stop screw 34 to rigidly and accurately locate the rod 24 and the rod axis 27, while at the same time permitting low friction axial motion. This type of bushing permits extremely accurate location of the rod axis 27. The bearing bushing 36 is adjusted radially by set screws 38 and 40, to provide zero clearance between the rod 24 and the balls in the bushing 36. The rod 24 is rigidly located radially, that is, with respect to axis 19, but is permitted low friction undimensional axial motion.

The housing 12 radially outwardly of the tapered portion of the rod 26 has conical or inclined surfaces 42 having an axis coincident with the rod axis 27. An annular ring 44 has outer inclined or conical surfaces 46 which complement inclined surfaces 42. The annular ring fits into a "quick latch" connector device 48 and engages threads 49 cut in the lower outer surface of the housing 12. When the connector 48 engages the annular ring 44, the complementing surfaces are mated so that the inclined surfaces 46 are on an axis coincident with the rod axis 27.

Four rigid probe fingers or probe tips 50, when in mutual contact as shown in FIGURE 1, form a generally-cylindrical outer surface 52 and a tapered or conical inner surface 54 having an axis 57. Four flat quadrant spring members 56 (see FIGURE 3) interconnect the annular ring 44 and the probe fingers 50 to normally bias the probe fingers into mutual contact. A larger or lesser number of probe fingers may be used. Presently, three or four probe fingers seem to be the optimum number from both performance and manufacturing considerations. The tapered rod surface 26 is formed or adapted to engage the inner tapered probe finger surface 54 to spread the probe finger equally apart as shown in FIGURE 2. When the annular ring 44 with the spring members 56 and probe fingers 50 is attached by the connector 48 to the housing 12, the fingers 50 define an axis coincident with the rod axis 27 and the spring members 56 define an annulus having a center lying on the rod axis 27 as shown in FIGURE 1. The probe fingers or tips 50, when in mutual contact, have a generally-spherical surface 58 formed on the end thereof. The probe fingers 50, the spring members 56 and the annular ring 44 form a stylus 55 having a plurality of expandable fingers. The spring portion 56 of the stylus serves to bias the expandable fingers 50 in a closed position and the annular ring portion 44 interconnects the stylus to the housing.

The post 14 may be connected to the coordinate measuring machine or the operational head by a device similar to that taught in commonly-assigned, copending application Ser. No. 468,903, filed July 1, 1965, by the present inventors, and entitled Probe and Probe Holding Device for Coordinate Measuring Machine, or by some other structure (not shown) which accurately locates the stylus 55 relative to the operational head.

In operation, the operational head is moved by holding the housing 12 and the control lever such that the rod 26 is fully retracted as shown in FIGURE 1 until the probe fingers or tips 50 are over the hole 60 in the workpiece 62 having an axis 61. The probe fingers are then lowered into the hole and the housing 12 and control lever 28 released. The coil spring 20 propels the rod 26 in the direction of the fingers 50. The tapered rod portion 26 contacts the tapered inner surface 54 of the fingers and spreads the fingers 50 against the bias of the flat springs 56; the stylus axis 57 is maintained substantially coincident with the rod axis 27 as shown in FIGURE 2. If, as will commonly occur, the fingers 50 are not lowered centrally into the hole; i.e. coincident with the axis 61, the coil spring 20 is operative to locate the probe stylus centrally within the hole. If the fingers are not centrally located in the hole 60, one or more fingers are in contact with the hole periphery. When that occurs, the rod is not in equilibrium and travels further into the probe fingers inner surface 54, spreading the probe fingers further apart and thereby moving the operational head into the proper central position. In order to achieve this automatic self-locating action, it is desirable that rod 26 be able to move axially freely within the passage and yet remain substantially radially fixed relative to the housing. These two apparently contrary objectives are achieved by the use of the ball bearing bushing 36 which locates the rod accurately and radially immovably and yet permits the rod's axial movement with exceedingly low friction. The spherical tip of the fingers insures contact over a large portion of the periphery of the hole and introduces no variations in accuracy with the changing sizes of holes to be located within the range of operation of the probe tip.

It may be desirable to employ different stylus sizes to accommodate large variations in size of holes to be located. When the various sized stylii are to be changed, the "quick latch" is disconnected, the stylii exchanged, and the new stylus connected by the "quick latch" connector to the housing. The accuracy of location of the stylus is insured by the complementing inclined or conical shape of the housing and the annular ring. Such accuracy is achieved without the necessity for careful adjustment.

It can be readily appreciated that the present invention achieves the stated objects. The stylus fingers reach below the hole surface for axis location, thereby avoiding the error causing edge variations. The present invention is usable in standard work and manufacturing areas. It is not affected by temperature variations or humidity variations commonly occurring in industrial environments. Dust, dirt and other foreign matter will not jam or damage the device. The stylii can be easily removed and wiped clean. The present invention construction is strong and durable; the device may be subject to comparatively rough handling without damaging its accuracy. Since the fingers and the rod are spring mounted, a blow or impact will be cushioned. Error-inducing bending moments are eliminated by the ball bearing bushing and by the complementing inclined surfaces of the annular ring and the housing.

The area of contact between the inclined rod portion and the inclined inner probe finger surface reduces bending moments. In addition, the housing 12 and the ball bearing bushing 36 isolate from the stylus finger members 55 radial forces so that bending moments on the finger members are substantially reduced. The tapered surfaces 54 of the stylus finger members 26 and of the plunger member respectively are designed to apply a minimum of radial force to the finger members. Yet, the radial force available at the finger tips are sufficient to accurately self-position the coordinate measuring machine within the feature to be located. The finger members are substantially rigid to eliminate errors which would arise for their bending or other physical distortion. Further, the stylii are readily and quickly interchanged by the use of the "quick latch" connector.

The present invention is easy to use. Its self-locating feature makes it ideal for hand use. The present invention can be quickly and accurately employed by an operator with no lost time spent in adjusting the machine or attempting to achieve an accurate central location.

While certain structures and mode of operation have been described in detail by the foregoing illustration and specification, variations may be made in the specific structure and arrangement of the elements herein without departing from the scope or the spirit of the present invention.

We claim:
1. A probe for a coordinate measuring machine comprising:
 a housing means having a passage therein opened at one end thereof;
 a plunger member disposed in the passage having a conically-shaped end portion;
 a coil spring member disposed within the housing means for biasing the plunger member toward the open end of the passage;
 a control arm connected to the housing means by first bearing means for rotation;
 the plunger member having second bearing means connected thereto in contactive engagement with the control arm member;
 a ball bearing bushing means for guiding the plunger disposed in the housing intermediate of the open end of the housing and the second bearing means;
 a stylus means having a plurality of mutually abutting expandable finger members, a plurality of substantially-flat spring members and an annular ring;
 each of said plurality of spring members fixedly interconnecting an expandable finger member to the annular ring member radially inwardly thereof and operative to bias the finger members in a mutually abutting position;
 the annular ring member having a conical outer surface;
 a connector member formed on one end of said housing means having a conical inner surface complementary to the annular ring conical surface to locate with respect to and connecting the stylus means to the housing means; and the stylus means finger members having a conically-shaped inner surface so formed that the conical plunger surface is adapted to separate the expandable finger members against the bias of the flat spring members.

2. The device described in claim 1 wherein:
the probe finger members have a spheroidal tip formed thereon.

3. The device described in claim 1 wherein:
stop means are fixedly connected to the housing means for limiting the motion of the plunger member.

4. A probe for a coordinate measuring machine comprising:
a housing means having a passage therein open at one end thereof;
a spring biased plunger means having a tapered end portion disposed in the passage;
a control arm means rotatably connected to the housing means for controlling the positions of the plunger means in the passage;
bearing means for guiding the plunger disposed in the housing intermediate of the open end of the housing and the control arm means;
a stylus means having a plurality of expandable finger members, a plurality of mutually abutting flat spring members and an annular ring member having a tapered outer surface;
the flat spring members disposed intermediate of the annular ring member and the expandable finger members to bias the finger members in a mutually abutting position;
a connector member connected to said housing means having a tapered inner surface adapted to complement the annular ring tapered outer surface for connecting the stylus means to the housing means; and
the stylus means finger members having a tapered inner surface adapted to be forced apart by the plunger means tapered surface against the bias of the flat spring members.

5. An internal locating device comprising:
a housing means having a passage formed therein;
a plunger member axially movable within said passage
a stylus member connected to one end of said housing means in axial alignment with said plunger member said stylus member having:
a plurality of axially-extending, mutually contacting, rigid probe fingers collectively forming a generally-cylindrical outer surface and a conical inner surface aligned with said plunger member;
a plurality of radially-extending, flat spring members each connected at its radially-inner end to one end of said probe fingers respectively;
an annular ring member connected to the radially-outer ends of said spring members providing a common connection therefor; and
means for axially moving said plunger member into contactive abutment with said conical inner surface to expand said probe fingers.

6. The device as claimed in claim 5 wherein:
said means for axially moving said plunger consists of spring means biasing said plunger in a probe-expandable direction and lever means for manually retracting said plunger.

7. The device as claimed in claim 5 wherein:
the annular ring member of said stylus member and said housing means having complementary conical locating surfaces; and
a connector member is removably secured to said housing means operative to clamp said annular ring through said complementary surfaces to said housing means.

References Cited

UNITED STATES PATENTS

| | | | |
|---|---|---|---|
| 1,259,335 | 3/1918 | Acton | 33—191 |
| 2,329,067 | 9/1943 | Maag | 33—178 |
| 2,566,970 | 9/1951 | Swensson | 33—178 |
| 2,642,672 | 6/1953 | Lewis et al. | 33—178 |
| 2,842,858 | 7/1958 | Mennesson | 33—178 |
| 3,210,855 | 10/1965 | Carter et al. | 33—191 |

SAMUEL S. MATTHEWS, *Primary Examiner.*